FISHER & BALL.
Reaping Machine.
No. 56,545.
Patented July 24, 1866.
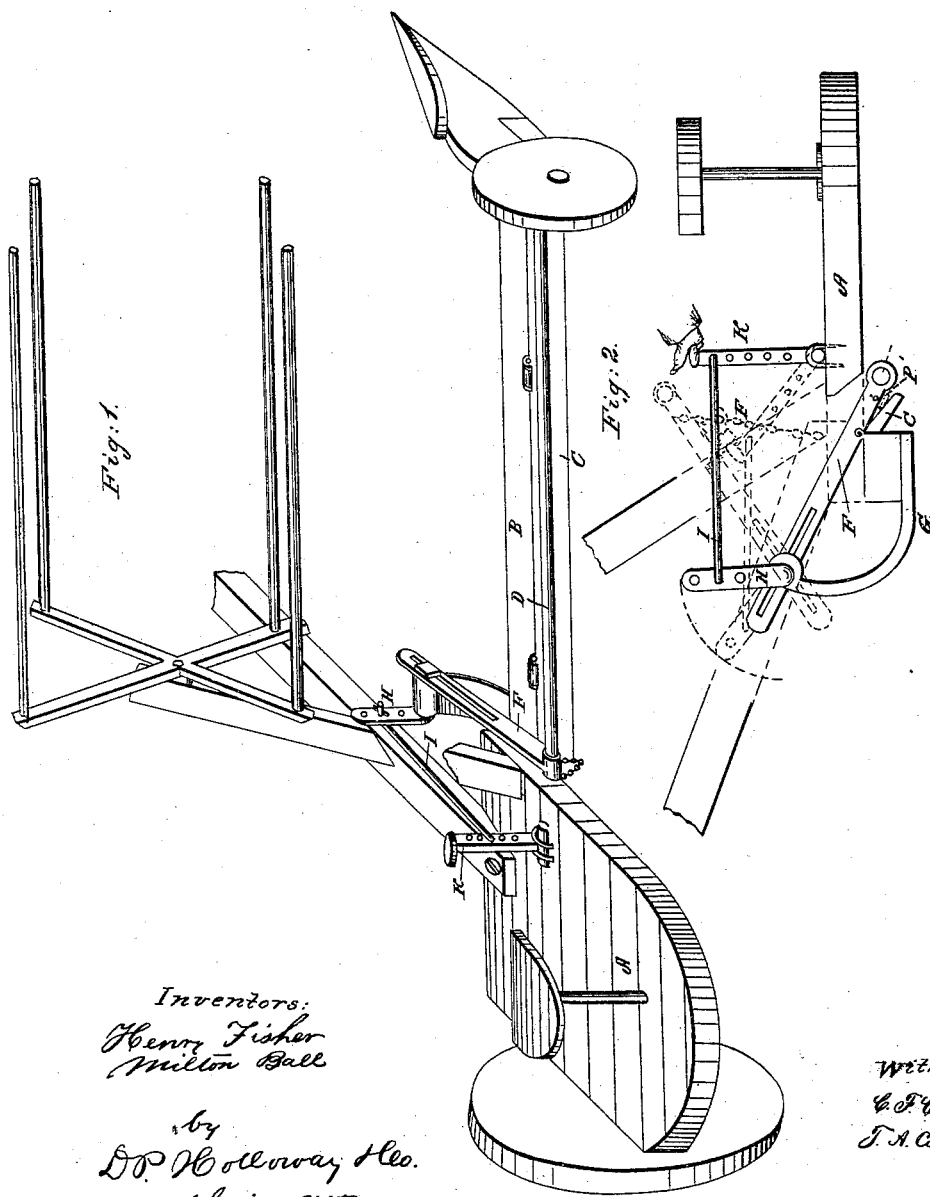
Inventors:
Henry Fisher
Milton Ball
by
D. P. Holloway & Co.
their Atty.
Witnesses:
C. F. Claufen
J. A. Connolly

UNITED STATES PATENT OFFICE.

HENRY FISHER AND MILTON BALL, OF CANTON, OHIO.

IMPROVEMENT IN REAPING-MACHINES.

Specification forming part of Letters Patent No. 56,545, dated July 24, 1866.

*To all whom it may concern:*

Be it known that we, HENRY FISHER and MILTON BALL, of Canton, in the county of Stark and State of Ohio, have invented certain new and useful Improvements in Harvesters; and we do hereby declare that the following is a full, clear, and exact description of the same, reference being had to the annexed drawings, made part of this specification, in which—

Figure 1 is a perspective view made from behind the machine. Fig. 2 is a side elevation, the changes in the position of the parts being indicated in red lines.

In the different figures the same letters indicate identical parts.

Only that portion of a reaping-machine is shown that contains the improvements made by us.

A is the main frame, and B the finger-bar, of the ordinary harvester. We dispense entirely with the platform usually attached to the finger-bar of a reaping-machine. To the back of the finger-bar B we hinge a board, C, about three or four inches in width and extending the entire length of the finger-beam. The object of this wing C is to retain the butts of the cut grain from jumping off from the finger-beam, on which it stands nearly perpendicularly, the heads being supported by the rod D, which is parallel to the wing C and of the same length. This rod is supported at one end only by the arm F, which is adjustably attached to the wing C by the chain F', which, being held by a hook through one of its links, may be adjusted according to the length of the grain. The other end of this arm F is attached to the journal of the crank H by a wrist passing through a longitudinal slot in the arm F, and having a screw-thread turned on its outer extremity to receive a nut, which, impinging upon, holds the arm F in the required position. This crank-journal works in the upper end of the curved piece G, and the arm of the crank is perforated with a series of holes for the purpose of receiving the bent end of the connecting-rod I, which is similarly attached to the foot-lever K, hinged to the main frame in front of the driver's seat at convenient distance.

The driver pressing his foot against the foot-lever K, the rod D and hinged wing C are raised to receive the cut grain, sustaining it in a nearly perpendicular position, the butts resting on the finger-beam B until grain enough to constitute a sheaf has been accumulated, when, the foot being withdrawn from the lever K, the rod D and wing C instantly drop, and the gavel falls in a line behind the cutting apparatus, the rod and wing being immediately brought up by the pressure of the foot, as before.

The reel is of the kind ordinarily known as an "overhung reel," being attached to a single post at the main-frame end only.

Having fully set forth the nature of our improvements, what we claim as our invention, and seek to secure by Letters Patent, is—

1. The combination of the slotted arm F and chain F', attached to the hinged wing-board C, for the purpose of adjusting the rod D vertically and horizontally, substantially as and for the purpose set forth.

2. In combination with an overhung reel and cutter-bar B, the hinged board C and rod D, attached at the main-frame end only to an oscillating arm, F, substantially in the manner and for the purpose set forth.

In testimony whereof we have signed our names to this specification in the presence of two subscribing witnesses.

HENRY FISHER.
MILTON BALL.

Witnesses:
T. L. KEEFER,
GEO. W. RAFF.